United States Patent [19]

Köhler et al.

[11] Patent Number: 5,017,682

[45] Date of Patent: May 21, 1991

[54] PROCESS FOR THE PRODUCTION OF UNBRANCHED POLYARYLENE SULFIDES OF IMPROVED COLOR QUALITY AND IMPROVED COLOR STABILITY

[75] Inventors: Burkhard Köhler; Rolf-Volker Meyer; Ernst-Ulrich Dorf; Wolfgang Rüsseler; Manfred Schmidt, all of Krefeld, Fed. Rep. of Germany

[73] Assignee: Bayer Aktiengesellschaft, Leverkusen-Bayerwerk, Fed. Rep. of Germany

[21] Appl. No.: 394,120

[22] Filed: Aug. 14, 1989

[30] Foreign Application Priority Data

Aug. 25, 1988 [DE] Fed. Rep. of Germany ....... 3828760

[51] Int. Cl.$^5$ .............................................. C08G 75/14
[52] U.S. Cl. ..................................................... 528/388
[58] Field of Search ......................................... 528/388

[56] References Cited

FOREIGN PATENT DOCUMENTS 0087045 8/1983 European Pat. Off. .
0121206 10/1984 European Pat. Off. .
0140272 5/1985 European Pat. Off. .
0215258 3/1987 European Pat. Off. .
0215259 3/1987 European Pat. Off. .

*Primary Examiner*—Morton Foelak
*Attorney, Agent, or Firm*—Connolly and Hutz

[57] ABSTRACT

The invention relates to a process for the production of linear, unbranched polyarylene sulfides from aromatic dichlorine compounds and alkali sulfides in tetraalkylated, cyclic ureas as the reaction medium.

4 Claims, No Drawings

PROCESS FOR THE PRODUCTION OF UNBRANCHED POLYARYLENE SULFIDES OF IMPROVED COLOR QUALITY AND IMPROVED COLOR STABILITY

This invention relates to a process for the production of linear, unbranched polyarylene sulfides from aromatic dichlorine compounds and alkali sulfides in tetraalkylated, cyclic ureas as reaction medium.

It is known that unbranched polyarylene sulfides having high melt viscosities can be produced from dialkali sulfide hydrates and aromatic dichlorine compounds in the absence of water (EP-OS 171 021). These polyarylene sulfides have a high melt viscosity. There is no need to use branching agents or a curing step. The solvents used include, for example, N-methyl caprolactam and/or N,N-dialkyds. However, the products obtained in this way do not always show satisfactory color properties under extreme thermal stressing.

It is known from EP-OS 87 045 that branched polyarylene sulfides of improved color quality can be produced from dihalo-, trihalo- and/or tetrahalobenzenes and alkali sulfides in the presence of N,N'-tetraalkylated cyclic ureas as solvent. However, these branched products show the disadvantages typical of branched thermoplastics, including for example relatively poor toughness and elongation at break.

It has now been found that linear polyarylene sulfides of improved color quality and color stability can be obtained from aromatic dihalogen compounds and sulfur donors in selected N,N'-dialkylated, cyclic ureas providing water present in the reaction mixture, for example from dialkyl sulfide hydrates, is azeotropically removed in a step preceding the polymerization reaction in which the aromatic dihalogen compound used may serve as entraining agent for the azeotropic removal of water.

Accordingly, the present invention relates to a process for the production of polyarylene sulfides, preferably polyphenylene sulfides, from (a) 50 to 100 mol-% aromatic dihalogen compounds corresponding to the following formula

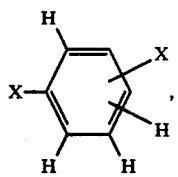

and 0 to 50 mol-% aromatic dihalogen compounds corresponding to the following formula

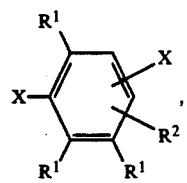

in which
the X's represent halogen, such as chlorine or bromine, atoms in the meta or para position to one another and
the $R^1$'s may be the same or different and represent hydrogen, $C_1$–$C_4$ alkyl, $C_5$–$C_{10}$ cycloalkyl, $C_5$–$C_{24}$ aryl, $C_7$–$C_{24}$ alkylaryl, $C_7$–$C_{24}$ arylalkyl; two substituents $R^1$ in the ortho position to one another may be attached to form an aromatic or heterocyclic ring containing 6 to 24 atoms, in which up to 3 ring C atoms may be replaced by hetero atoms, such as N, O, S, and at least one substituent $R^1$ is not hydrogen, and alkali sulfides, preferably sodium or potassium sulfide or mixtures thereof, preferably in the form of their hydrates or aqueous mixtures, optionally together with alkali hydroxides, such as sodium and potassium hydroxide, the molar ratio of aromatic dichlorine compounds to sulfides being in the range from 0.85:1 to 1.15:1 and preferably in the range from 0.95:1 to 1.05:1, characterized in that N,N'-dialkylated cyclic ureas corresponding to formula (III)

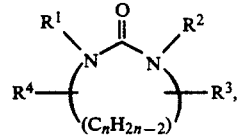

in which
$R^1$ and $R^2$ may be the same or different and represent $C_1$–$C_{22}$ alkyl, $C_5$–$C_{24}$ aryl, preferably methyl, ethyl, and, more preferably, methyl,
$R^3$ and $R^4$ represent hydrogen (H), $C_1$–$C_{22}$ alkyl, preferably H or methyl and
n is the number 2, 3 or 4, preferably the number 2 or 3 and, more preferably, the number 2,
are used as the solvent, the molar ratio of alkali sulfides to the organic solvent is in the range from 1:2 to 1:5, anhydrous starting materials are initially introduced and heated to at least 150° C. and preferably to a temperature in the range from 205° to 220° C. while aqueous materials and residues of the anhydrous starting materials are introduced in the form of a solution or melt or in solid form in such a way that the water introduced is removed from the reaction mixture by distillation and the reaction is then carried out at temperatures in the range from 210° to 270° C. and preferably in the range from 215° to 250° C., optionally under a slight excess pressure of up to 10 bar.

According to the invention, the catalysts used may be any of the known compounds, including for example alkali fluorides, alkali phosphates, alkali carboxylates, ε-caprolactam, preferably ε-caprolactam, used in the usual quantities, i.e. from 0.02 to 1.0 mol catalyst is used per mol alkali sulfide.

N,N-Dialkyl carboxylic acid amides of $C_1$–$C_8$ aliphatic and $C_5$–$C_{12}$ aromatic carboxylic acids, for example, may be used as co-solvents in a quantity of from 0.02 to 1 mol per mol alkali sulfide.

The alkali sulfides are used in the usual quantities and in the usual way. Suitable alkali sulfides are, for example, lithium, sodium, potassium and rubidium sulfide, preferably sodium and potassium sulfide. In addition, the alkali sulfides may be produced in situ from hydrogen sulfides using alkali hydroxides, such as LiOH, NaOH and KOH. Mixtures both of the sulfides and of the hydroxides may be used.

According to the invention, aromatic meta- and para-dihalogen compounds corresponding to formulae (I) and (II) may be used. In this case, the ratio of aromatic meta-dihalogen to aromatic para-dihalogen compound may be up to 30:70. Aromatic p-dihalogen compounds are particularly preferred.

Examples of aromatic dihalogen compounds corresponding to formula (I) suitable for use in accordance with the invention are p-dichlorobenzene, p-dibromobenzene, 1-chloro-4-bromobenzene, 1,3-dichlorobenzene, 1,3-dibromobenzene, 1-chloro-3-bromobenzene, 1-chloro-3-bromobenzene. They may be used individually or in admixture with one another. 1,4-Dichlorobenzene and 1,4-dibromobenzene are particularly preferred.

Examples of aromatic dihalogen compounds corresponding to formula (II) suitable for use in accordance with the invention are 2,5-dichlorotoluene, 2,5-dichloroxylene, 1-ethyl-2,5-dichlorobenzene, 1-ethyl-2,5-dibromobenzene, 1-ethyl-2-bromo- 5-chlorobenzene, 1,2,4,5-tetramethyl-3,5dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. They may be used individually or in admixture with one another.

Organic solvents suitable for use in accordance with the invention are N,N'-dimethyl-2-imidazolidinone, N,N'-dimethyl-2-tetrahydropyrimidinone, N,N'-dimethyl-3-methyl-2-imidazolidinone, N,N'-dimethyl-2-tetrahydrodiazepinone or the corresponding N,N'-diethyl compounds.

The reaction time may be up to 40 hours and is preferably between 2 and 25 hours. The reaction is carried out at atmospheric pressure or under an excess pressure of up to 8 bar and preferably in the range from 0.3 to 3 bar.

In the practical application of the process according to the invention, the anhydrous reaction components may be combined in any order. The aqueous starting materials are added in any order to the resulting mixture heated to 150°-220° C. and preferably to 165°-200° C. either individually or in admixture at such a rate that the water introduced in the form of water of hydration and/or water of solution can be removed from the mixture by azeotropic distillation, for example the azeotrope distilling off with aromatic halogen compounds corresponding to formulae (I), (II) and (III) or with the solvent or additional entraining agent, and separated off. After separation of the entrained water, the aromatic halogen compound is returned to the reaction mixture.

The reaction mixture may be worked up and the polyarylene sulfides isolated by known methods.

The polyarylene sulfide may be separated off from the reaction solution by known methods, for example by filtration or by centrifugation, either directly or, for example, after the addition of water and/or dilute acids. Separation of the polyarylene sulfide is generally followed by washing with water. Washing or extraction with other washing liquids, which may be carried out in addition to or after this wash, is also possible.

The polyarylene sulfide may also be obtained, for example, by distilling off the solvent and washing with water as described above.

The polyarylene sulfides according to the invention may be blended with other polymers and with pigments and fillers for example graphite, metal powders, glass powder, quartz powder or glass fibers, or may be provided with the additives typically used for polyarylene sulfides, including for example stabilizers and mold release agents, etc.

In general, the melt flow behavior of polyarylene sulfides is measured in accordance with ASTM 1238-70 at 316° C. using a 5 kg weight and is expressed in g/10 minutes.

However, with high melt flow indices, this method may be problematical in view of the high outflow rate of the polymer melt.

The melt viscosity $\eta m$ of the polymer melt (in Pa.s) at 306° C. was determined as a function of the shear stress $\tau$ (in Pa.s) using an Instron rotational viscosimeter.

In this way, the melt viscosity can be determined over a very wide range of from $10^{-1}$ to $10^7$ Pa.s. In the Instron rheometer, the polymer is fused between a fixed plate and a rotatable cone and the torque of the cone is determined. From the torque, the angular speed and the apparatus data, it is possible to calculate the melt viscosity as a function of the shear stress. An Instron model 3250 Rheometer (diameter of the cone and plate 2 cm) was used.

The melt viscosity measured at a shear stress $\tau$ of $10^2$ Pa is shown.

The polyarylene sulfides according to the invention may be processed by extrusion, extrusion blow molding, injection molding or other standard techniques to form films, moldings or fibers. The products thus obtained may be used for standard applications, for example as automotive components, fittings, electrical components, for example switches, electronic boards, parts and apparatus resistant to chemicals and weathering, such as pump housings and pump flywheels, etching baths, sealing rings, parts of office machines, valves, ball bearing components, etc.

Moldings of the polyarylene sulfides according to the invention have a very light natural color which changes very little, even in the event of prolonged thermal stressing (for example 260° C. in air).

The polyarylene sulfides according to the invention also have the advantageous mechanical properties of linear thermoplastics.

COMPARISON EXAMPLE 1

This Comparison Example describes the production of polyphenylene sulfide as described in EP-OS 87 045, but without the use of branching agents.

A mixture of 143.5 g sodium sulfide trihydrate and 5.7 g NaOH was heated to 185° C. in 450 ml N,N'-dimethyl ethylene urea, 64 ml distillate consisting essentially of water condensing. After the addition of 160.2 g p-dichlorobenzene, the mixture was heated for 9 hours to 270° C. and, after cooling, was precipitated in 10 liters isopropanol. After acidifcation with sulfuric acid to pH 1, the product was filtered and washed with distilled water until free from electrolyte. A white powder was obtained. The melt viscosity was 5 Pa. A melt of the product was white in color.

COMPARISON EXAMPLE 2

This Example describes the production of polyphenylene sulfide in N-methyl caprolactam preceded by a water removal step in which the water of hydration of the sodium sulfide is removed by azeotropic distillation using p-dichlorobenzene as entraining agent.

A mixture of 1149.3 g sodium sulfide ·2.8 $H_2O$, 141.1 g ε-caprolactam, 325 g water and 4 g sodium hydroxide was added dropwise together with 611.5 g p-dichlorobenzene to a mixture of 611.5 g p-dichlorobenzene and 2653 g N-methyl caprolactam at such a rate that the sump temperature was 215° C., the water of hydration and the water added distilling off azeotropically and the p-dichlorobenzene being returned. The reaction mixture was then heated under reflux for 24 hours, precipitated in 40 l isopropanol, acidified with sulfuric acid to pH 1, filtered and washed until free from electrolyte. A light beige powder was obtained. The melt viscosity was 130 Pa. A melt of the product was grey in color.

A melt of the polyphenylene sulfide of Comparison Example 2 was heated in air to 260° C. After 1 hour, the melt was black in color.

EXAMPLE 1

The procedure was as described in Comparison Example 2. N,N'-dimethyl-2-imidazolidinone was used as solvent instead of N-methyl caprolactam. A white powder was obtained. The melt viscosity was 20 Pa. A melt of the product was white in color.

EXAMPLE 2

The melt of Example 1 was heated for 200 h at 260° C. The melt was light beige in color.

EXAMPLE 3

A solution of sodium sulfide prepared at approximately 90° C. from 663 ml water, 503.2 g sodium hydroxide and 230.4 g hydrogen sulfide is added dropwise over a period of 4 hours to a solution of 462.4 g p-dichlorobenzene in 2041 g N,N'-dimethyl butylene urea (DMBU) boiling at 210° C. The water added dropwise is distilled off azeotropically and removed from the circuit through a column head, the azeotrope former p-dichlorobenzene being returned to the reaction mixture. At the same time, another 462.4 g p-dichlorobenzene are added, followed by boiling for another 10 hours.

The reaction solution is precipitated in 40 l isopropanol and acidified to pH 1. The solid separated off is filtered, washed with water until free from electrolyte and dried at 100° C. in a vacuum drying cabinet. The product accumulates in the form of a white powder. It has a melt viscosity of 25 Pa.s. A melt of the product was white in color.

EXAMPLE 4

The melt of Example 3 was heated for 200 hours at 260° C. The melt was light beige in color.

EXAMPLE 5

The same procedure was followed as that described in comparative example 3. Instead of N-methylcaprolactam, N,N'-dimethylpropyleneurea (N,N'-dimethyl-2-tetrahydropyrimidinone) was used as the solvent. A white powder was obtained. The melt viscosity was 60 Pas. A melt of the product was white in colour.

EXAMPLE 6

The melt of Example 5 was heated for 200 hours at 260° C.

The melt was beige in colour.

We claim:
1. A process for the production of high molecular weight polyarylene sulfides from
  (a) 50 to 100 mol-% aromatic dihalogen compounds corresponding to the formula

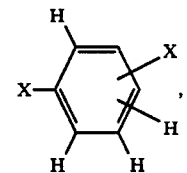

and 0 to 50 mol-% aromatic dihalogen compounds corresponding to the formula

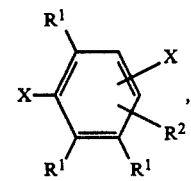

in which
  the X's are halogen atoms selected from chlorine and bromine atoms, in the meta- or para-position to one another and
  the $R^1$'s may be the same or different and represent hydrogen, alkyl, cycloalkyl, aryl, alkylaryl, arylalkyl; two substituents $R^1$ in the ortho position to one another are attached to form an aromatic or heterocyclic ring and at least one substituent $R^1$ is not hydrogen, and
  (b) alkali sulfides, optionally together with alkali hydroxides, and molar ratio of aromatic dichlorine compounds to sulfides being in the range from 0.85:1 to 1.15:1,
wherein N,N'-dialkylated cyclic ureas corresponding to formula (III)

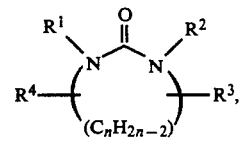

in which
  $R^1$ and $R^2$ one alkyl or aryl
  $R^3$ and $R^4$ represent hydrogen (H) or $C_1$–$C_{22}$ alkyl and
  n is the number 2, 3 or 4,
and in that the molar ratio of alkali sulfides to the organic solvent is in the range from 1:2 to 1:5, anhydrous starting materials are introduced first and heated to at least 150°.C. and aqueous materials and residues of the anhydrous starting materials are introduced in the form of a solution or melt or in solid form in such a way that the water introduced is removed from the reaction mixture by distillation and the reaction is subsequently carried out at temperatures in the range from 210° C. to 270° C. optionally under a slight excess pressure.

2. A process as claimed in claim 1, characterized in that 1,4-dichlorobenzene is used as the aromatic dihalogen compound of formula (I).

3. A process as claimed in claim 1, characterized in that N,N'-dimethyl-2-imidazolidinone is used as solvent.

4. A process as claimed in claim 1, characterized in that the condensation is carried out at an excess pressure of 0.3 to 3 bar.

* * * * *